(12) United States Patent
Liu et al.

(10) Patent No.: US 8,630,230 B2
(45) Date of Patent: Jan. 14, 2014

(54) METHOD OF REDUCING INTERFERENCE BETWEEN TWO COMMUNICATION SYSTEMS OPERATING IN ADJACENT FREQUENCY BANDS

(75) Inventors: Tai-Cheng Liu, Kaohsiung (TW); Chi-Chen Lee, Taipei (TW); Ming-Chun Cheng, Taoyuan County (TW); Chun-Jen Tsai, Tainan County (TW); Chia-Ming Chang, Hsinchu (TW); Ching-Hwa Yu, Tainan (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 337 days.

(21) Appl. No.: 12/962,623

(22) Filed: Dec. 7, 2010

(65) Prior Publication Data

US 2011/0134746 A1 Jun. 9, 2011

Related U.S. Application Data

(60) Provisional application No. 61/267,174, filed on Dec. 7, 2009.

(51) Int. Cl.
*H04W 4/00* (2009.01)

(52) U.S. Cl.
USPC .......................... 370/328; 370/278; 370/282

(58) Field of Classification Search
USPC ............. 370/338, 401, 201, 260, 329, 431
See application file for complete search history.

(56) References Cited

U.S. PATENT DOCUMENTS

| | | | | |
|---|---|---|---|---|
| 8,284,709 | B2 * | 10/2012 | Youn et al. | 370/315 |
| 2004/0116143 | A1 * | 6/2004 | Love et al. | 455/522 |
| 2005/0181823 | A1 | 8/2005 | Haartsen | |
| 2006/0274704 | A1 * | 12/2006 | Desai et al. | 370/338 |
| 2007/0066314 | A1 | 3/2007 | Sherman | |

(Continued)

FOREIGN PATENT DOCUMENTS

| | | | | |
|---|---|---|---|---|
| CN | 101335669 A | 12/2008 | | |
| WO | 2008124796 A1 | 10/2008 | | |
| WO | WO 2008124796 A1 * | 10/2008 | | H04B 17/00 |

OTHER PUBLICATIONS

International application No. PCT/CN2010/079535, International filing date:Dec. 7, 2010, International Searching Report mailing date: Mar. 10, 2011.

*Primary Examiner* — Anh-Vu Ly
*Assistant Examiner* — Gustavo Lopez-Vargas
(74) *Attorney, Agent, or Firm* — Winston Hsu; Scott Margo (57) ABSTRACT

A method of reducing interference between two communication systems operating in adjacent frequency bands and coexisting in a communication device is provided, and the two communication systems are a first communication system and a second communication system. The method includes deciding whether to perform an arbitration procedure on a downlink subframe of the first communication system according to a CINR of the first communication system and a RSSI of the second communication system; deciding whether to perform the arbitration procedure on an uplink subframe of the first communication system according to a transmit power of the first communication system and a RSSI value of the second communication system; and when deciding to perform the arbitration procedure on the downlink or uplink subframe, further deciding whether to send a specific packet to request one or more stations not to send packets to the second communication system.

18 Claims, 7 Drawing Sheets

(56) References Cited

U.S. PATENT DOCUMENTS

| | | |
|---|---|---|
| 2007/0135162 A1 | 6/2007 | Banerjea |
| 2007/0232358 A1 | 10/2007 | Sherman |
| 2008/0205365 A1 | 8/2008 | Russell |
| 2008/0247445 A1 | 10/2008 | Guo |
| 2008/0297419 A1 | 12/2008 | Dou |
| 2008/0299987 A1 | 12/2008 | Iyer |
| 2009/0080401 A1 | 3/2009 | Zhu |
| 2009/0081962 A1 | 3/2009 | Sohrabi |
| 2009/0213773 A1 | 8/2009 | Yoon |
| 2010/0128622 A1* | 5/2010 | Horiuchi et al. .............. 370/252 |

* cited by examiner

METHOD OF REDUCING INTERFERENCE BETWEEN TWO COMMUNICATION SYSTEMS OPERATING IN ADJACENT FREQUENCY BANDS

CROSS REFERENCE TO RELATED APPLICATIONS

This application claims the benefit of U.S. Provisional Application No. 61/267,174, filed on Dec. 7, 2009 and entitled "Dynamic Arbitration Mechanism for Mitigating the Coexistence Effects between Two System Operating in Different Frequency Bands", the contents of which are incorporated herein.

BACKGROUND OF THE INVENTION

The present invention relates to a method of reducing interference between two communication systems operating in adjacent frequency bands, and more particularly, to a method of reducing interference between two communication systems operating in adjacent frequency bands and coexisting in a device with a limited space.

With the progress of wireless network technology and the growing demand for mobile communication, communication devices as laptops or cell phones supporting various wireless communication standards, e.g. Bluetooth, WiFi, 4G (WiMAX, LTE, and etc. . . . ) or 3G, is expected to be a must in modern life for a more convenient access to the wireless network.

WiMAX and WiFi systems operates on adjacent frequency bands, which are the 2.4 GHz Industrial Scientific and Medical (ISM) band and the licensed 2.3 GHz and 2.5 GHz bands. Most WiMAX systems use Time Division Duplex (TDD) to allocate radio resources because TDD has higher spectral efficiency and can be implemented with lower complexity. A TDD frame is divided into a downlink subframe and an uplink subframe. A WiFi system is a contention-based system without dedicated radio resource and uses a technique called carrier sense multiple access with collision avoidance (CSMA/CA). With CSMA/CA, a WiFi station monitors the wireless medium and decides when to transmit packets. When the wireless medium is detected to be idle, the WiFi station is permitted to transmit; and when the wireless medium is detected to be busy, the WiFi station defers its transmission for a random period following the wireless medium turns to be idle again.

Figure 1:
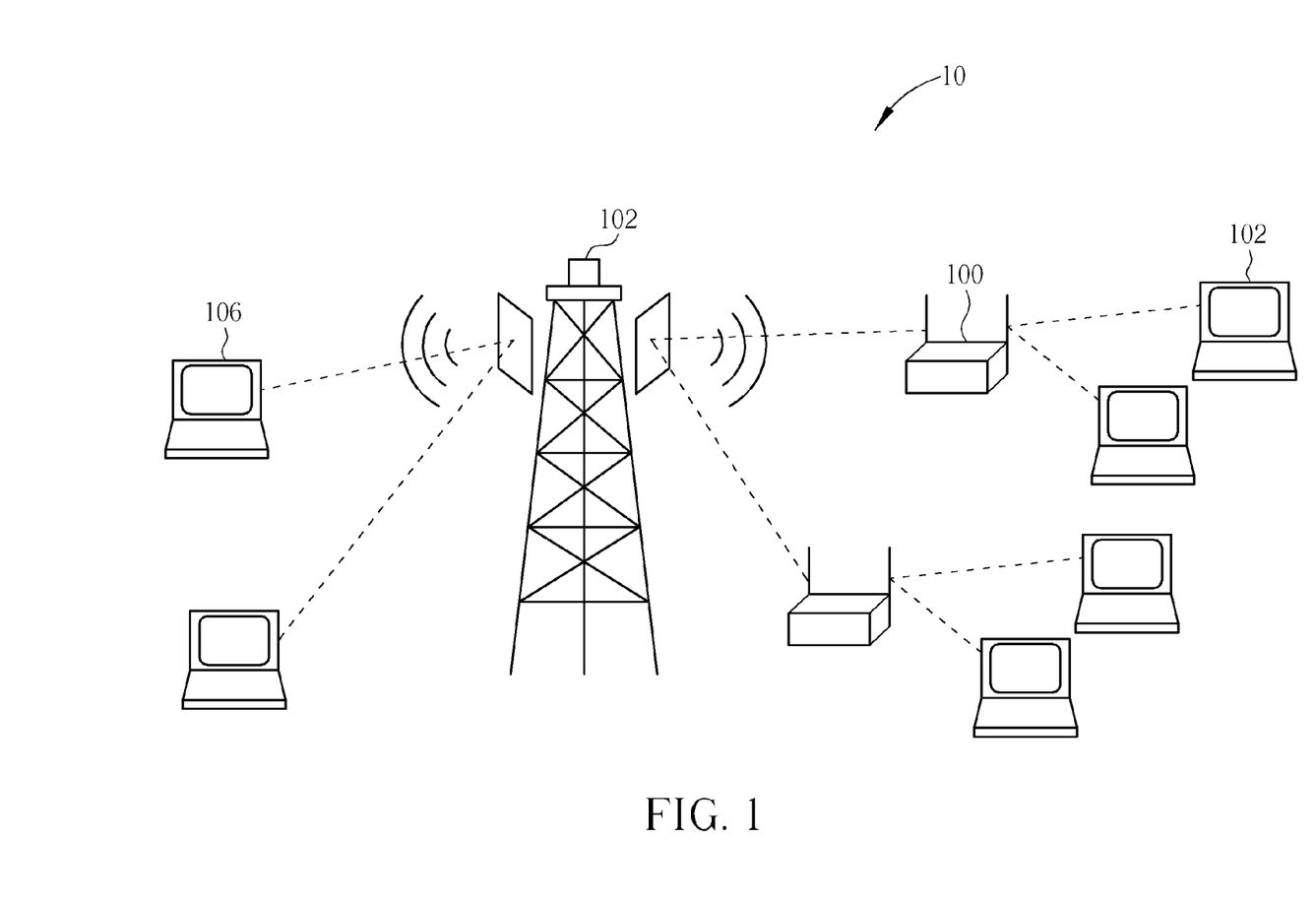
FIG. 1 is a diagram of a WiMAX network according to the prior art.

Please refer to FIG. 1, which is a diagram of a WiMAX network 10 according to the prior art. A WiMAX-WiFi coexistence device 100 is a combination of a WiMAX system and a WiFi system, which can be a WiMAX-WiFi portable router or a WiMAX-WiFi customer-premises equipment (CPE) and performs as a WiMAX router connecting with a WiMAX base station 102 and a WiFi access point (AP) connecting with WiFi stations 104 as laptops or multimedia players. Therefore, the WiFi stations 104 are able to access the WiMAX network and communicate with WiMAX subscriber stations 106 via the WiMAX-WiFi coexistence device 100.

Since the guard band between the 2.4 GHz band for WiFi and the 2.3/2.5 GHz band for WiMAX are narrow and the portable WiMAX-WiFi coexistence device has limited dimensions, mutual interference between WiMAX and WiFi systems in the portable WiMAX-WiFi coexistence device is hard to be reduced.

In the WiMAX-WiFi conexistence device, when the WiFi system (which performs as a WiFi AP) is transmitting packets during a WiMAX downlink subframe, the WiFi transmitter interferes with the WiMAX receiver and decreases efficiency of WiMAX downlink reception, which has to be improved because the WiMAX system uses licensed bands and the waste of bandwidth is not acceptable. On the other side, when the WiFi system is receiving packets during a WiMAX uplink subframe, the WiMAX transmitter interferes with the WiFi receiver and WiFi packets cannot be received successfully, which causes a problem that the WiFi station may use the lower MCS (Modulation and Coding Scheme) rate according to its rate adaptation mechanism, and finally, interference is getting more serious until the WiFi stations and the WiFi system are disconnected.

There are several ways to reduce the mutual interference in the portable WiMAX-WiFi coexistence device. One is using RF filters in the RF front-end of the WiMAX and WiFi systems, which does help but is not cost-effective. Another one is using an arbitration procedure, such as the packet traffic arbitration (PTA) procedure as defined for WiFi-Bluetooth coexistence, to coordinate sharing of radio resources dynamically based on traffic load or traffic priority of the two systems.

However, when the WiMAX-WiFi coexistence device uses conventional arbitration procedure to try to reduce interference, the WiMAX-WiFi coexistence device does not take WiFi station connecting with WiMAX-WiFi coexistence device into consideration. The WiFi station cannot get information about the interference inside the WiMAX-WiFi coexistence device, and may still send packets to the WiMAX-WiFi coexistence device and wait for acknowledgements. On the other side, the WiFi system of the WiMAX-WiFi coexistence device may not receive packets successfully due to the mutual interference and does not send acknowledgement as response. As a result, the WiFi station will use the lower MCS (Modulation and Coding Scheme) transmission rate according to its rate adaptation mechanism, and the connection quality and channel utilization between the WiMAX-WiFi coexistence device and the WiFi station is getting worse due to the retransmissions and inefficiency MCS.

SUMMARY OF THE INVENTION

It is therefore a primary objective of the claimed invention to provide an method of reducing interference between two communication systems operating in adjacent frequency bands and coexisting in a communication device.

According to an embodiment of the present invention, a method of reducing interference between two communication systems operating in adjacent frequency bands and coexisting in a communication device, the two communication systems including a first communication system using Time Division Duplex (TDD) and a second communication system which is contention-based. The method includes deciding whether to perform an arbitration procedure on a downlink subframe of the first communication system according to a carrier to noise plus interference ratio (CINR) of the first communication system and a received signal strength indicator (RSSI) value of the second communication system, wherein the first communication system is set to have a higher priority than the second communication system in the arbitration procedure; deciding whether to perform the arbitration procedure on an uplink subframe of the first communication system according to a transmit power of the first communication system and a RSSI value of the second communication system; and when deciding to perform the arbitration procedure on the downlink or uplink subframe, further deciding whether to send a specific packet to request one or more stations not to send packets to the second communication system.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . . " Also, the term "couple" is intended to mean either an indirect or direct electrical connection. Accordingly, if one device is coupled to another device, that connection may be through a direct electrical connection, or through an indirect electrical connection via other devices and connections.

Figure 2:
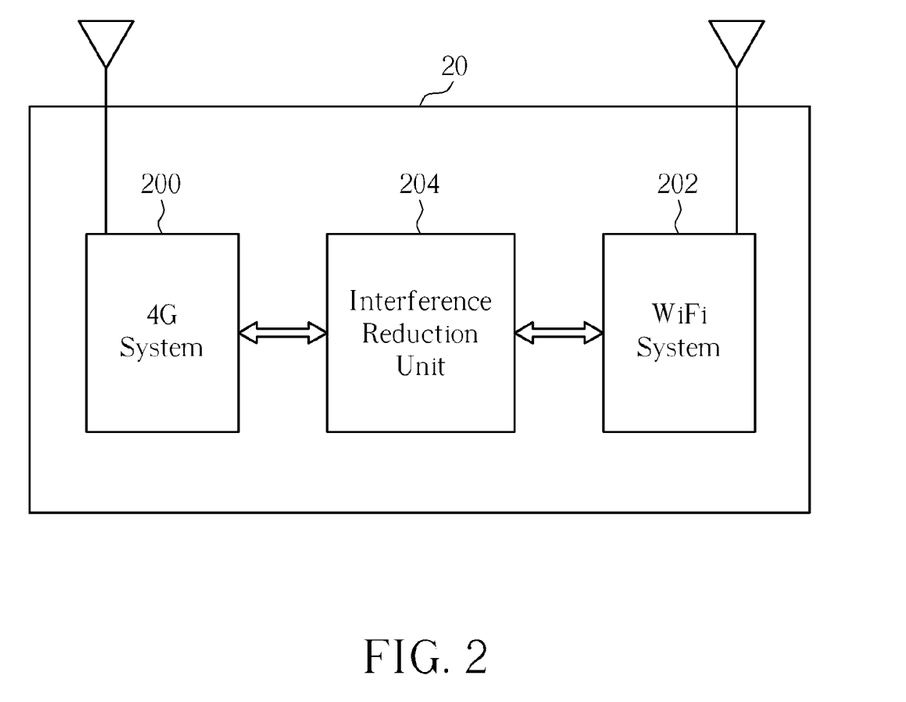
FIG. 2 is a schematic diagram of a 4G-WiFi coexistence device according to an embodiment of the present invention.

Please refer to FIG. 2, which is a schematic diagram of a 4G-WiFi coexistence device 20 according to an embodiment of the present invention. The 4G-WiFi coexistence device 20 comprises a 4G system 200 (including a transmitter and a receiver), a WiFi system 202 (including a transmitter and a receiver) and an interference reduction unit 204. The 4G-WiFi coexistence device 20 can be a 4G-WiFi portable router or a 4G-WiFi consumer-premises equipment (CPE), and can replace the 4G-WiFi coexistence device 10 in FIG. 1. In view of WiFi stations, the WiFi system 202 performs as a WiFi access point (AP) and the 4G system 200 performs as a 4G router to route data packets to 4G base station or to the connecting WiFi Stations.

Please note that, the 4G-WiFi coexistence device 20 is one of embodiments of the present invention. The 4G-WiFi coexistence device 20 can be referred to any other coexistence device including two communication systems operating in adjacent frequency bands, in which one communication system uses Time Division Duplex (TDD) to allocate radio resources, and the other communication system is a contention-based system.

As to a preferred embodiment, the interference reduction unit 204 is software-implemented, capable of executing program code. However, the present invention does not give the limitation that to implement the interference reduction unit 204 by software; it is also possible to implement the interference reduction unit 204 by hardware.

Figure 3:
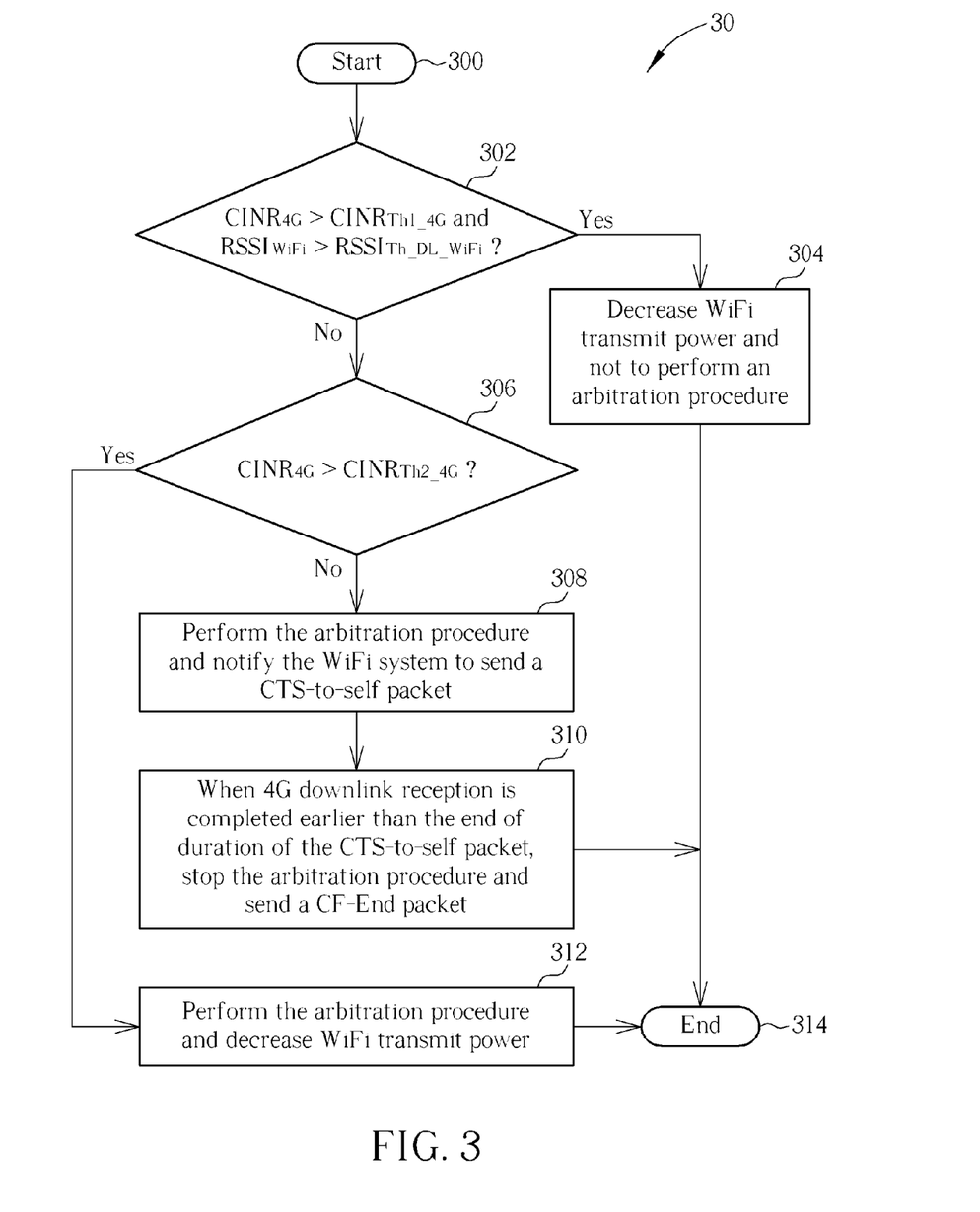
FIG. 3 is a flowchart of a process according to an embodiment of the present invention.
Figure 5:
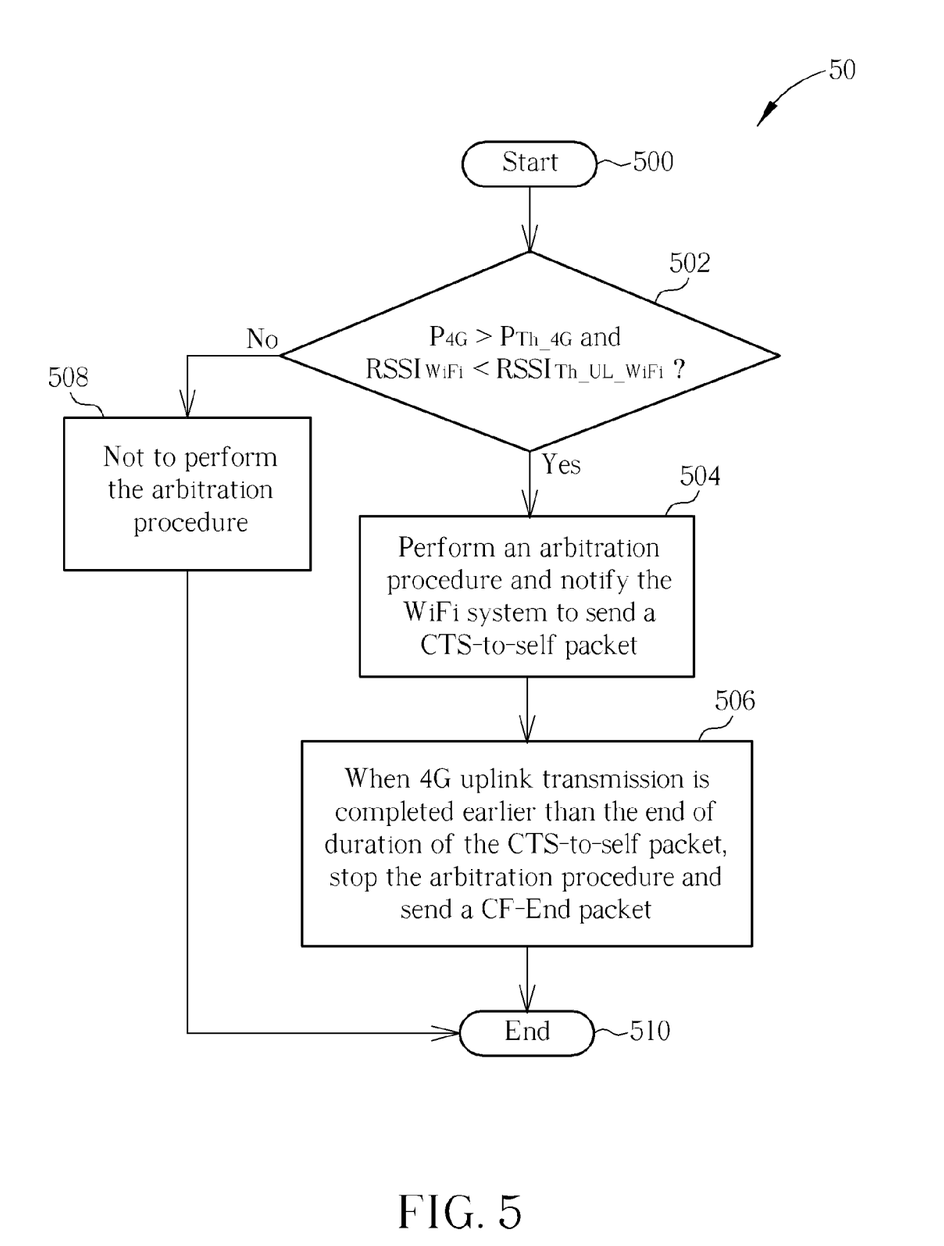
FIG. 5 is a flowchart of a process according to an embodiment of the present invention.

Please refer to FIG. 3 and FIG. 5. FIG. 3 and FIG. 5 are flowcharts of a process 30 and a process 50 according to embodiments of the present invention, which can be compiled into program code and performed by the interference reduction unit 204, for reducing interference between the 4G system 200 and the WiFi system 202. The interference reduction unit 204 is able to acquire system parameter values from the 4G system 200 and the WiFi system 202, e.g. received signal strength indicator (RSSI), transmit power, in-band noise/interference power, carrier to noise plus interference ratio (CINR) and so on, which are used in the processes 30 and 50.

The process 30 is utilized for reducing interference on 4G downlink reception caused by the WiFi transmitter at 4G downlink subframes. The process 30 comprises the following steps:

Step 300: Start (when 4G system and WiFi cannot operate at the same time without interfering each other).

Step 302: Determine whether a 4G CINR value $CINR_{4G}$ is larger than a 4G CINR threshold $CINR_{Th1\_4G}$ and a WiFi RSSI value $RSSI_{WiFi}$ is larger than a WiFi RSSI threshold $RSSI_{Th\_DL\_WiFi}$. If $CINR_{4G}$ is larger than $CINR_{Th1\_4G}$ and $RSSI_{WiFi}$ is larger than $RSSI_{Th\_DL\_WiFi}$, perform Step 304; else, perform 306.

Step 304: Decrease WiFi transmit power and not to perform an arbitration procedure.

Step 306: Determine whether $CINR_{4G}$ is larger than another 4G CINR threshold $CINR_{Th2\_4G}$. If $CINR_4G$ is not larger than $CINR_{Th2\_4G}$, perform Step 308; else, perform 312.

Step 308: Perform the arbitration procedure and notify the WiFi system to send a CTS-to-self packet.

Step 310: When 4G downlink reception is completed earlier than the end of duration of the CTS-to-self packet, stop the arbitration procedure and send a CF-End packet.

Step 312: Perform the arbitration procedure and decrease WiFi transmit power.

Step 314: End.

First note that, the process 30 includes three mechanisms, an arbitration procedure, reserve channel procedure by sending CTS-2-Self packet and a power control procedure, which are performed under different conditions of system parameters. The arbitration procedure handles each transmit attempt from two systems and can be realized in various ways, e.g. packet traffic arbitration (PTA) in IEEE 802.15 standard, which is well-known to those skilled in the art. The process 30 does not aim at how the arbitration procedure performs but when the arbitration procedure performs and thus detail of the arbitration procedure is omitted herein. For the arbitration procedure in the process 30, the 4G system is set to a higher priority than the WiFi system.

According to Step 302, a 4G CINR value $CINR_4G$ that the interference reduction unit 204 acquires is compared with a predefined 4G CINR threshold $CINR_{Th1\_4G}$, and this comparison intends to know if 4G downlink reception quality is good enough to sustain certain level of interference from the WiFi transmitter; in addition, a WiFi RSSI value $RSSI_{WiFi}$ that the interference reduction unit 204 acquires is compared with a predefined WiFi RSSI threshold $RSSI_{Th\_DL\_WiFi}$, and this comparison intends to know if a WiFi station connecting with the 4G-WiFi coexistence device 20 is near the 4G-WiFi coexistence device 20. When $CINR_{4G}$ is larger than $CINR_{Th1\_4G}$ and $RSSI_{WiFi}$ is larger than $RSSI_{Th\_DL\_WiFi}$, which implies that 4G downlink reception and WiFi received signal strength are good enough, the interference reduction unit 204 decreases WiFi transmit power to be lower than the original power and decides not to perform the arbitration procedure. In merit of a lower WiFi transmit power, interference on 4G downlink reception is reduced. As a result, 4G system and WiFi can perform transmission and reception simultaneously in this case.

On the other hand, when $CINR_{4G}$ is not larger than $CINR_{Th1\_4G}$ or $RSSI_{WiFi}$ is not larger than $RSSI_{Th\_DL\_WiFi}$, according to Step 306, $CINR_{4G}$ is further compared with a 4G CINR threshold $CINR_{Th2\_4G}$ smaller than $CINR_{Th1\_4G}$. When $CINR_{4G}$ is not larger than $CINR_{Th2\_4G}$, 4G downlink reception may be interfered seriously; in this situation, according to Step 308, the interference reduction unit 204 performs the arbitration procedure and notifies the WiFi system 202 to send a CTS (clear-to-send)-to-self packet, which is received by all the WiFi stations connecting with the WiFi system 202 and thus the WiFi stations are informed of not to transmit packets to the WiFi system 202 during the given period.

Timing to send the CTS-to-self packet can be controlled by a timer. For example, the timer can be set to start (or expire) 1 ms earlier than the end of each 4G uplink subframe to trigger the CTS-to-self packet. In addition, a reservation period indicated in CTS-to-self packet can be set to a length equal to the 4G downlink subframe or the 4G downlink reception, so that the 4G downlink reception is well-protected as much as possible. During the duration reserved by CTS-to-self packet, the WiFi system 202 receives no packets and does not need to respond an acknowledgement (ACK) packet. Interference caused by transmitting ACK packages is avoided.

According to Step 310, when the interference reduction unit 204 detects that 4G downlink reception is completed earlier than the end of the reservation duration indicated in the CTS-to-self packet, the interference reduction unit 204 stops the arbitration procedure and sends a CF (contention-free)-End packet. The CF-End packet is received by all the WiFi stations connecting with the WiFi system 202, so that the WiFi stations are informed that the previous reservation specified in WiFi system 202 is released and the contention-based service begins. By using Step 310, the WiFi system 202 can provide services more efficiently, which are illustrated in FIG. 4A and FIG. 4B more clearly.

Figure 4A:
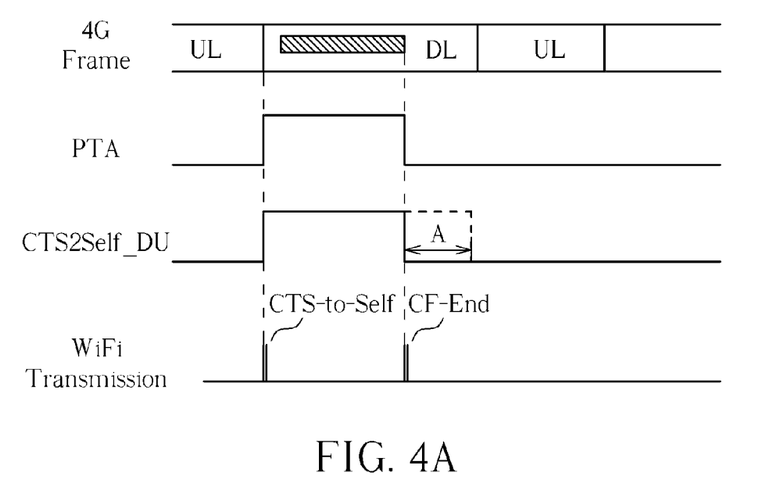
FIG. 4A and FIG. 4B are timing diagrams illustrating the CTS-to-self packet and the CF-End packet based on the process of FIG. 3.
Figure 4B:
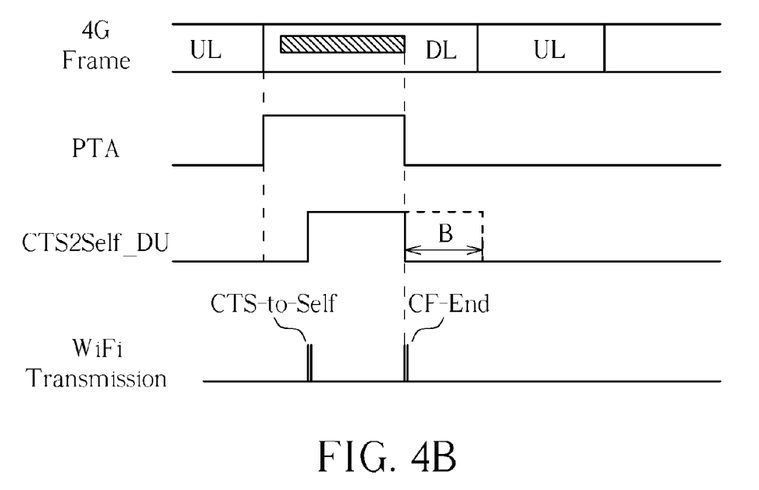

In FIG. 4A and FIG. 4B, a signal PTA indicates when the arbitration procedure is ongoing or stopped, and a signal CTS2Self_DU indicates the CTS-to-self packet duration. As shown in FIG. 4A, the arbitration procedure is started (PTA from low to high) and the CTS-to-self packet is sent at the beginning of the 4G downlink subframe, and the end of original CTS-to-self packet duration is depicted in dashed-line. When 4G downlink reception is completed, the arbitration procedure is stopped (PTA from high to low), the CF-End packet is sent, and the CTS-to-self packet duration is stopped (CTS2Self_DU from high to low) as depicted in solid-line. Therefore, a time period "A" is saved by use of the CF-End packet. As shown in FIG. 4B, somehow transmission of the CTS-to-self packet is delayed, e.g. due to medium is busy and the CTS-to-self packet duration starts late. When 4G downlink reception is completed, the CF-End packet is sent and the CTS-to-self packet duration is stopped at as the depicted in solid-line in replace of the original end depicted in dashed-line. Consequently, a time period "B" is saved. As a result of using Step 310, after the 4G downlink reception is completed, the WiFi system 202 returns to provide services with the WiFi stations without waiting until the end of CTS-to-self packet duration.

Remind that, Step 308 and Step 310 are performed when 4G downlink reception is interfered seriously. On the other hand, when the interference reduction unit 204 determines that $CINR_{4G}$ is larger than $CINR_{Th1\_4G}$, the interference on 4G downlink reception may be acceptable. In other words, interference caused by transmission of WiFi ACK packets is acceptable. In this situation, the interference reduction unit 204 performs the arbitration procedure and decreases WiFi transmit power. No that, in this situation, the interference reduction unit 204 does not send the CTS-to-self to the WiFi stations; when the WiFi stations transmit packets to the WiFi system 202, the WiFi system 202 transmits ACK packets with a lower power in response.

From the above, the process 30 provides three modes for reducing interference and every time the interference reduction unit 204 performs the process 30, one of the three modes is decided to be used according to values of system parameters. The first mode is using the power control procedure only as illustrated in Step 302 and Step 304. The power control procedure in the process 30 only includes decreasing WiFi transmit power, which is an embodiment and not a restriction. The second mode is using the arbitration procedure combined with transmission of the CTS-to-self and CF-End packets as illustrated in Steps 302, 306, 308 and 310. The third mode is using the arbitration procedure combined with the power control procedure and with no transmission of CTS-to-self packet, as illustrated in Steps 302, 306 and 312.

Please note that, the CTS-to-self packet in the process 30 can be replaced with another packet which can inform the WiFi stations that not to send packets, such as a null packet including only preamble, signal symbol and MAC header, or a dummy protocol data unit (PDU) including only header and no user data. However, when the 4G downlink reception is completed earlier than the end of duration of the null packet (or dummy PDU), the duration of the null packet cannot be stopped and thus the WiFi system 202 cannot provide contention-based service as soon as possible.

The process 50 is performed by the interference reduction unit 204, for reducing interference on the WiFi receiver caused by 4G uplink transmission at 4G uplink subframes. The process 50 comprises the following steps:

Step 500: Start (when WiMAX and WiFi cannot operate at same time without interfering each other).

Step 502: Determine whether a 4G transmit power value $P_{4G}$ is larger than a 4G transmit power threshold $P_{Th\_4G}$ and a WiFi RSSI value $RSSI_{WiFi}$ is smaller than a WiFi RSSI threshold $RSSI_{Th\_UL\_WiFi}$. If $P_{4G}$ is larger than $P_{Th\_4G}$ and $RSSI_{WiFi}$ is smaller than $RSSI_{Th\_UL\_WiFi}$, perform Step 504; else, perform 508.

Step 504: Perform an arbitration procedure and notify the WiFi system to send a CTS-to-self packet.

Step 506: When 4G uplink transmission is completed earlier than the end of duration of the CTS-to-self packet, stop the arbitration procedure and send a CF-End packet.

Step 508: Not to perform the arbitration procedure.

Step 510: End

According to Step 502, a 4G transmit power value $P_{4G}$ is compared with a predefined 4G transmit power threshold $P_{Th\_4G}$ and a WiFi RSSI value $RSSI_{WiFi}$ is compared with a predefined WiFi RSSI threshold $RSSI_{Th\_UL\_WiFi}$. This comparison intends to know if the WiFi receiver is interfered with 4G uplink transmission. When $P_{4G}$ is larger than $P_{Th\_4G}$ and $RSSI_{WiFi}$ is smaller than $RSSI_{Th\_DL\_WiFi}$, which indicates that the WiFi receiver is interfered and the received packets may fail to be successfully decoded, the interference reduction unit 204 performs Step 504 and Step 506; otherwise, according to Step 508, the interference reduction unit 204 does not perform the arbitration procedure.

According to Step 504 (similar to Step 308), the interference reduction unit 204 performs an arbitration procedure and notifies the WiFi system 202 to send a CTS-to-self packet, to inform the WiFi stations not to transmit packets. Note that transmission of the CTS-to-self packet is necessary because the WiFi receiver of the WiFi system 202 may unsuccessfully decode the received packet duo to the interference and cannot send an ACK packet as a response, or may decode the received packet successfully but cannot send an ACK packet since the arbitration procedure is already started (in which 4G System is set to a higher priority). According to Step 506 (similar to Step 310), when the 4G system uplink transmission is completed earlier than the end of duration of the CTS-to-self packet, the interference reduction unit 204 stops the arbitration procedure and sends a CF-End packet, so that the WiFi stations are informed that the WiFi system 202 is released and the contention-based service begins. Please note that the arbitration procedures shown in the process 30 and the process 50 are the same. In the process 50, CTS-to-self packet can also be replaced with a null packet or a dummy PDU.

Remind that, the process 30 is utilized for reducing interference on 4G4G downlink reception caused by the WiFi transmitter at 4G downlink subframes, and the process 50 is utilized for reducing interference on the WiFi receiver caused by 4G uplink transmission at 4G uplink subframes. When the interference reduction unit 204 performs the processes 30 and 50 and thereby, for a long time, decides to perform the arbitration procedure and send the CTS-to-self packet at both of downlink and uplink subframes, the WiFi system 202 may have no radio resource to transmit packets. To help the WiFi system to obtain radio resources at such a situation, a process 60 is provided and illustrated in FIG. 6.

Figure 6:
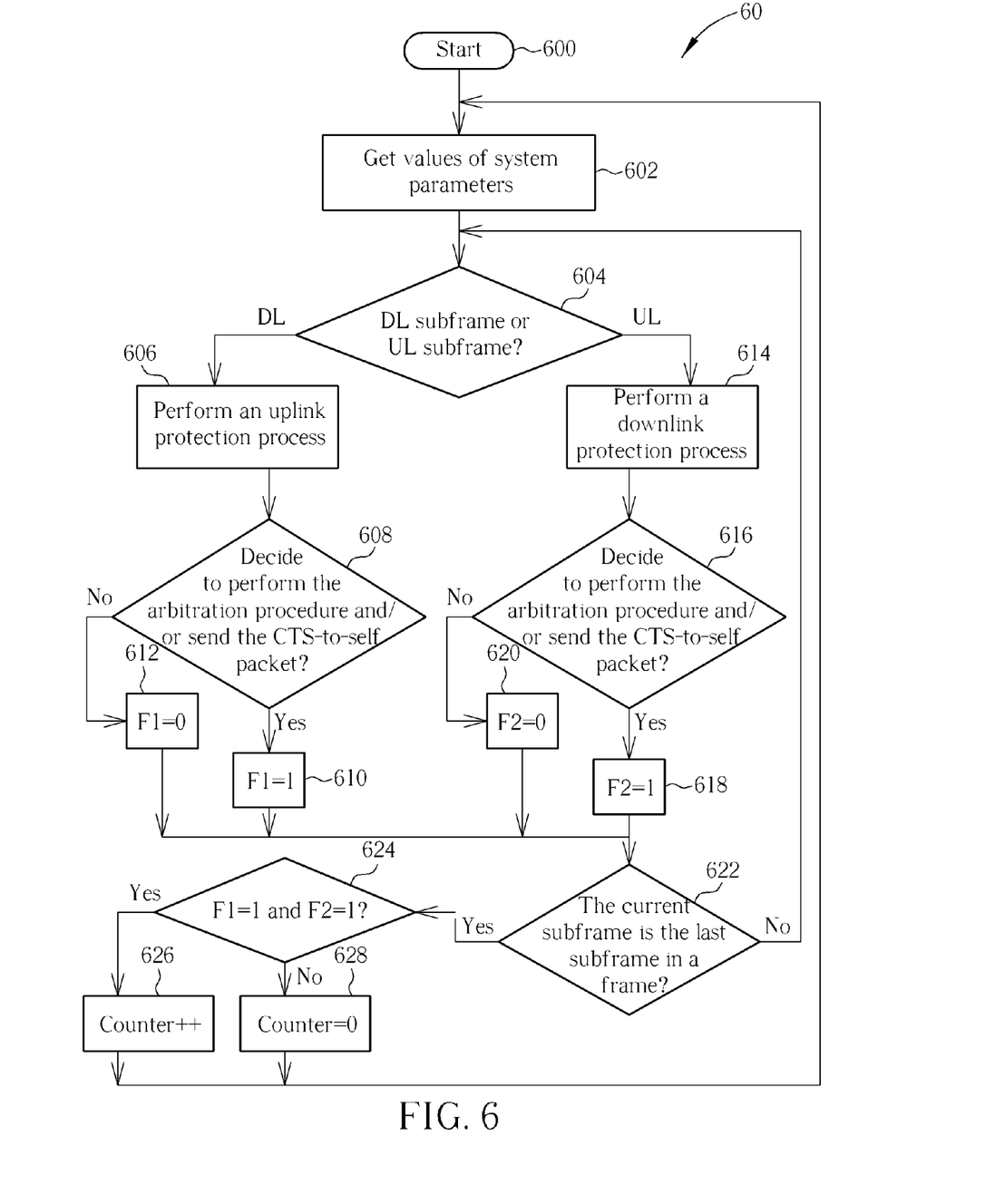
FIG. 6 is a flowchart of a process according to an embodiment of the present invention.

The process 60 can be compiled into program code and is performed by the interference reduction unit 204. The process 60 comprises the following steps:

Step 600: Start (when WiMAX and WiFi cannot operate at same time without interfering each other).

Step 602: Get values of system parameters.

Step 604: Check whether a current subframe is for downlink or uplink. When the current subframe is for downlink, perform Step 606; else, perform Step 614.

Step 606: Perform an uplink protection process.

Step 608: Check whether to perform the arbitration procedure and/or send the CTS-to-self packet at a next subframe. If yes, perform Step 610; else, perform Step 612.

Step 610: Set a flag F1 to 1.

Step 612: Set a flag F1 to 0.

Step 614: Perform a downlink protection process.

Step 616: Check whether to perform the arbitration procedure and/or send the CTS-to-self packet at a next subframe. If yes, perform Step 618; else, perform Step 620.

Step 618: Set a flag F2 to 1.

Step 620: Set a flag F2 to 0.

Step 622: Check whether the current subframe is the last subframe in a frame. If yes, perform Step 624; else, perform Step 604.

Step 624: Check whether the flags F1 and F2 are set to 1. If yes, perform Step 626; else, perform Step 628.

Step 626: Increase the value of a counter.

Step 628: Reset the value of a counter and return to perform Step 602.

According to Step 602, the interference reduction 204 acquires values of system parameters, such as RSSI, CINR and transmit power of the 4G system 200 and the WiFi system 202 used in the processes 30 and 50. Note that the system parameters used in processes 30 and 50 are embodiments and are not restrictions on the present invention. Those skilled can also use signal to signal to noise ratio (SNR), modulation and coding scheme (MCS) and any other system parameters representing conditions of 4G system 200 and WiFi system 202.

The process 60 and the processes 30 and 50 included in the process 60 are performed frame by frame, so that the interference between the 4G system 200 and the WiFi system 202 can be preferably reduced according to the latest values of system parameter values.

According to Step 604, the interference reduction unit 204 checks whether a current subframe is a downlink subframe or an uplink subframe. When the current subframe is a downlink subframe, the interference reduction unit 204 performs an uplink protection process (Step 606) that is the process 50 of FIG. 5; otherwise, when the current subframe is an uplink subframe, the interference reduction unit 204 performs a downlink protection process (Step 614) that is the process 30 of FIG. 3. From the above, the interference reduction procedure (which is the arbitration procedure plus sending CTS-to-self packet or the power control procedure, for example) used for a current downlink/uplink subframe is decided in a preceding uplink/downlink subframe. That is, the interference reduction procedure for a next subframe is decided in advance.

Note that, Steps 608, 610 and 612 are similar to Steps 616, 618 and 620. According Steps 608, 610 and 612, the interference reduction unit 204 checks whether to perform the arbitration procedure and/or send the CTS-to-self packet at a next subframe, which implies that the WiFi system 202 may have little resources to transmit at the next subframe. The interference reduction unit 204 uses a flag F1 to record that the WiFi system 202 has little (or even no) resources to transmit at the next subframe, F1=1, or has enough resource to transmit, F1=0. The flag F2 is also used in a similar way.

According to Step 622 and Step 624, the interference reduction unit 204 checks whether the current subframe is the last subframe in a frame, and when the current subframe is the last subframe, the interference reduction unit 204 further checks whether both of the flags F1 and F2 are set to 1, which indicates that the arbitration procedure is performed and the CTS-to-self is sent in the downlink subframe and also the uplink subframe, and thus the WiFi system 202 has no resource to transmit/receive packets. When F1 and F2 are set to 1, according to Step 626, the interference reduction unit 204 increases the value of a counter, which is counted by frames, for example. The counter is preferably used for counting the number of "continuous" times that F1 and F2 are set to 1; when any one of F1 and F2 are set to 0, according to Step 628, the counter is reset to 0. Therefore, the value of the counter, $T_C$, indicates a continuous time during which the WiFi system 202 has no resource to transmit.

The value of the counter $T_C$ can be used to determine when the WiFi system 202 is able to transmit packets and how much time the WiFi system 202 can use for transmission.

Please note that, 4Ga scan mode is initiated by 4G mobile station to request a period of time for searching and monitoring suitability of neighbor base stations as targets for handover. In the scan mode, a 4G mobile station may send a scan request message to request a 4G base station to allocate time intervals to the mobile station. In some of exemplary embodiments, the scan request message is the mobile station indicates an estimated scanning duration (by including recommended start frame of the scanning duration), which is the time the mobile station requires scanning for available base stations. The base station may comply with the recommended start frame and set "start frame" as recommended by mobile station in a scan response message, in response to the scan request message.

In one embodiment, the interference reduction unit 204 uses one or more threshold values to be compared with $T_C$ and uses the scan request message as described above to determine when the WiFi system 202 is able to transmit packets. For example, when $T_C$ is larger than a threshold $T_1$, the interference reduction unit 204 notifies the 4G system 200 to send a scan request message to a 4G base station for requesting a scanning duration, in which 4G downlink reception and uplink transmission are stopped. Therefore, the WiFi system 202 can use the requested scanning duration to transmit packets. The interference reduction unit 204 is able to acquire a longer scanning duration corresponding to a larger $T_C$. In another embodiment of the present invention, when performing the process 60, the interference reduction unit 204 also monitors the size of an output buffer queue of the WiFi system 202. The interference reduction unit 204 can request a duration having a length corresponding to the size of an output buffer queue.

Please note that, when using the scan mode, the mobile station as the 4G-WiFi coexistence device 20 can decide the scanning duration to be used for the scan mode, or for the transmission of the WiFi system 202 according to the present invention.

In another embodiment of the present invention, when the value of the counter $T_C$ is larger than the threshold $T_1$, at a next frame (or at following frames), the interference reduction unit 204 reserves an N % of a 4G frame for the WiFi system 202.

In another embodiment of the present invention, when the value of the counter $T_C$ is larger than the threshold $T_1$, the interference reduction unit 204 stops the arbitration procedure on the downlink subframe for a time duration or stops the arbitration procedure on the uplink subframe for a time duration, so that the WiFi system 202 can use those duration to transmit packets.

Figure 7:
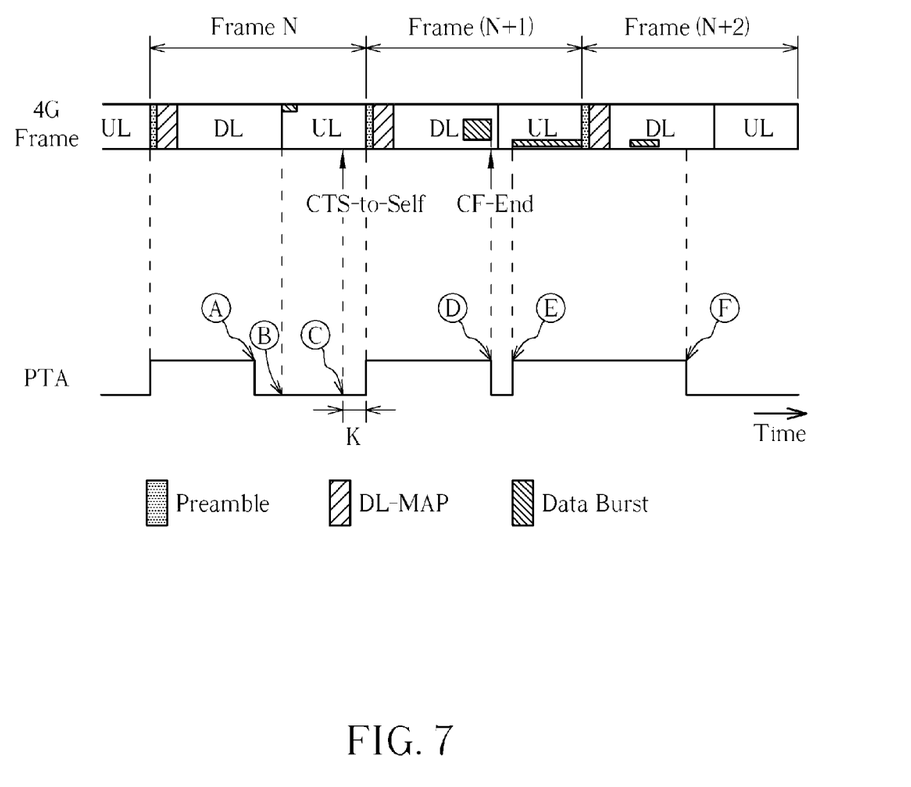
FIG. 7 is a timing diagrams illustrating interference reduction by performing the process of FIG. 6.

Please refer to FIG. 7, which is a timing diagram illustrating how the interference reduction unit 204 performs the process 60. In FIG. 7, a signal PTA indicates when the arbitration procedure is ongoing or stopped. PTA keeps in a high level for channel estimation or channel measurement from the beginning of the frame N to a time point "A", even there is no 4G data burst. In the uplink subframe of the frame N, a short 4G data burst generates at a time point "B". Please note that, when duration of the 4G data burst is less than a threshold and its interference on the WiFi system 202 is not so much, the interference reduction unit 204 may not perform the arbitration procedure.

A CTS-to-self packet is sent at a time point "C", which is Kms earlier than the end of the downlink subframe, so that the WiFi stations can know not to send packets to the WiFi system 202 in advance. At the beginning of the downlink subframe of the frame (N+1), PTA transits from low to high and thus the arbitration procedure is performed. Since a 4G downlink data burst is completed at a time point "D", PTA transits from high to low and a CF-End packet is sent; therefore, the CTS-to-self packet duration (not shown) is stopped earlier such that the WiFi system 202 begins to provide service earlier. In the uplink subframe of the frame (N+1), a 4G uplink data burst starts from a time point "E" and PTA transits again. In the downlink subframe of the frame (N+2), even if a 4G downlink data burst start is completed, PTA keeps high until a time point "F" for channel estimation or channel measurement.

In conclusion, through the aforementioned processes of the present invention, mutual interference between the 4G system and the WiFi system of the 4G-WiFi coexistence device is reduced, and the radio connection between the WiFi stations and the WiFi system (as an access point) can be maintained. Therefore, it is believed that the present invention can be applied in any coexistence device to solve mutual interference between two communication systems as 4G and WiFi systems.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of reducing interference between two communication systems operating in adjacent frequency bands and coexisting in a communication device, the two communication systems including a first communication system using Time Division Duplex (TDD) and a second communication system which is contention-based, the method comprising: not performing using a device for communicating with two communication systems the arbitration procedure on a downlink subframe of the first communication system when a carrier to noise plus interference ratio (CINR) value of the first communication system is larger than a CINR threshold and a received signal strength indicator (RSSI) value of the second communication system is larger than a downlink RSSI threshold, performing the arbitration procedure on an uplink subframe of the first communication system when a transmit power of the first communication system is larger than a transmit power threshold and the RSSI value of the second communication system is smaller than an uplink RSSI threshold; and when the arbitration procedure on the downlink or uplink subframe is performed, determining whether to send a specific packet to request one or more stations not to send packets to the second communication system.

2. The method of claim 1 further comprising:
when the CINR value of the first communication system is larger than the CINR threshold and the RSSI value of the second communication system is larger than the downlink RSSI threshold, decreasing the transmit power of the second communication system.

3. The method of claim 1 further comprising:
when the CINR value of the first communication system is smaller than a first CINR threshold but larger than a second CINR threshold, decreasing the transmit power of the second communication system, and performing the arbitration procedure on the downlink subframe and not to send the specific packet.

4. The method of claim 1 further comprising:
when the arbitration procedure on the downlink subframe is performed, sending the specific packet to request one or more station not to send packets to the second communication system.

5. The method of claim 4, wherein the specific packet is sent before the end of a preceding uplink subframe.

6. The method of claim 4 further comprising:
when the arbitration procedure is ongoing on the downlink subframe, the specific packet is a CTS-to-self packet, and downlink reception of the first communication system is completed earlier than the end of duration of the specific packet, stopping the arbitration procedure on the downlink subframe and sending a content-free end packet to the one or more stations to inform that the second communication system is released.

7. The method of claim 1 further comprising:
when the arbitration procedure on the uplink subframe is performed, sending a specific packet to request one or more stations connecting with the second communication system not to send packets to the second communication system.

8. The method of claim 7, wherein the specific packet is sent before the end of a preceding downlink subframe.

9. The method of claim 7 further comprising:
when the arbitration procedure is ongoing on the uplink subframe, the specific packet is a CTS-to-self packet, and uplink transmission of the first communication system is completed earlier than the end of duration of the specific packet, stopping the arbitration procedure on the uplink subframe and sending a content-free end packet to the one or more stations to inform that the second communication system is released.

10. The method of claim 1, wherein the specific packet is a CTS-to-self packet, a null packet, or a dummy protocol data unit (PDU) packet.

11. The method of claim 1, wherein the arbitration procedure on the downlink subframe and on the uplink subframe are performed frame by frame.

12. The method of claim 1 further comprising:
detecting whether the arbitration procedure is continuously performed on both of the downlink subframe and the uplink subframe for a first duration; and
when the arbitration procedure is continuously performed for the first duration, sending a scan request to a base station connecting with the first communication system, to request a second duration during which downlink reception and uplink transmission of the first communication system are stopped.

13. The method of claim 12, wherein the length of the second duration is corresponding to the length of the first duration.

14. The method of claim 12, wherein the length of the second duration is corresponding to the size of an output buffer queue of the second communication system.

15. The method of claim 1 further comprising:
detecting whether the arbitration procedure is continuously performed on both of the downlink subframe and the uplink subframe for a first duration; and
when the arbitration procedure is continuously performed for the first duration, stopping the arbitration procedure on the downlink subframe for a second duration.

16. The method of claim 1 further comprising:
detecting whether the arbitration procedure is continuously performed on both of the downlink subframe and the uplink subframe for a first duration; and
when the arbitration procedure is continuously performed for the first duration, stopping the arbitration procedure on the uplink subframe for a second duration.

17. The method of claim 1 further comprising:
detecting whether the arbitration procedure is continuously performed on both of the downlink subframe and the uplink subframe of a frame for a first duration; and
when the arbitration procedure is continuously performed for the first duration, reserving a ratio of each frame to be used by the second communication system for a second duration.

18. The method of claim 1 further comprising:
not performing the arbitration procedure on the uplink subframe when duration of upcoming uplink transmission of the first communication system is less than a threshold, regardless of the RSSI value of the second communication system and the transmit power value of the first communication system.

* * * * *